United States Patent
Xu et al.

(10) Patent No.: US 9,157,753 B2
(45) Date of Patent: Oct. 13, 2015

(54) NAVIGATION SYSTEM, RECORDING MEDIUM RECORDING COMPUTER PROGRAM, AND CURRENT POSITION CALCULATION METHOD

(71) Applicant: Alpine Electronics, Inc., Tokyo (JP)

(72) Inventors: Zhuoyuan Xu, Iwaki (JP); Shoichi Manzen, Iwaki (JP); Ayaka Koide, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 14/523,490

(22) Filed: Oct. 24, 2014

(65) Prior Publication Data

US 2015/0127247 A1 May 7, 2015

(30) Foreign Application Priority Data

Nov. 6, 2013 (JP) ................................. 2013-230216

(51) Int. Cl.
*G01C 21/34* (2006.01)

(52) U.S. Cl.
CPC ...................................... *G01C 21/34* (2013.01)

(58) Field of Classification Search
USPC ....................................................... 701/411
See application file for complete search history.

(56) References Cited

U.S. PATENT DOCUMENTS

| | | | | |
|---|---|---|---|---|
| 6,192,312 | B1* | 2/2001 | Hummelsheim | 701/118 |
| 6,317,683 | B1* | 11/2001 | Ciprian et al. | 701/118 |
| 6,684,250 | B2* | 1/2004 | Anderson et al. | 709/225 |
| 8,462,745 | B2* | 6/2013 | Alizadeh-Shabdiz | 370/338 |
| 8,478,297 | B2* | 7/2013 | Morgan et al. | 455/456.1 |
| 8,498,813 | B2* | 7/2013 | Oohashi et al. | 701/447 |
| 8,890,746 | B2* | 11/2014 | Alizadeh-Shabdiz et al. | 342/357.23 |
| 2009/0222202 | A1* | 9/2009 | Kato | 701/210 |
| 2010/0094537 | A1* | 4/2010 | Goto et al. | 701/201 |
| 2011/0125402 | A1* | 5/2011 | Mitsugi et al. | 701/208 |

FOREIGN PATENT DOCUMENTS

| | | |
|---|---|---|
| JP | 1998-253373 | 9/1998 |
| JP | 2003-194558 | 7/2003 |

* cited by examiner

*Primary Examiner* — Thomas Tarcza
*Assistant Examiner* — Alex C Dunn
(74) *Attorney, Agent, or Firm* — Brinks Gilson & Lione (57) ABSTRACT

When a narrow-angle branch point PA at which a road branches at a narrow angle gets closer, routes from the narrow-angle branch point to all points a-c reachable by traveling for a distance L after passing of the narrow-angle branch point in a current traveling direction. When the narrow-angle branch point is passed, processing to calculate, as a matching degree of each route, a matching degree between each of the gradients G1-G3 of routes R1-R3, which are indicated by map data, and history Ang of an inclination angle of a vehicle is performed until a route with a matching degree equal to or higher than a predetermined threshold is generated or until a distance L is traveled after the passing of the narrow-angle branch point. When the route with the matching degree equal to or higher than the predetermined threshold is generated, a current position is calculated on the route.

16 Claims, 5 Drawing Sheets

NAVIGATION SYSTEM, RECORDING MEDIUM RECORDING COMPUTER PROGRAM, AND CURRENT POSITION CALCULATION METHOD

RELATED APPLICATIONS

The present application claims priority to Japanese Patent Application Serial Number 2013-230216, filed Nov. 6, 2013, the entirety of which is hereby incorporated by reference.

BACKGROUND OF THE INVENTION

1. Field of the Invention

The present invention relates to techniques for navigation systems to calculate a current position.

2. Description of the Related Art

In a navigation system, techniques for calculating a current position such as two dimensional map-matching are known. In two dimensional map-matching, a navigation system calcules a current position on a road by map-matching between a road on a two-dimensional map and a two dimensional position in longitudinal and latitudinal directions or a track of the two dimensional position, which is measured by satellite positioning or autonomous navigation.

Techniques are known in such two dimensional map-matching to solve a problem of miscalculating a current position after passing of a branch point at which a road branches at a narrow angle. That is, in a known technique, after passing of a branch point at which a road branches at a narrow angle, a current position is calculated by performing, with each road branching at the branch point as a candidate road, map-matching in an altitude direction in which a matching degree between a gradient of each candidate road indicated by map data and an inclination detected by an inclination angle sensor is a reference (see, for example, JP 2003-194558 A and JP 10-253373 A).

SUMMARY OF THE INVENTION

According to the above-described technique for calculating a current position by performing, after passing a branch point at which a road branches at a narrow angle, the map-matching in an altitude direction with each road branching at the branch point as a candidate road, the following problem arises in a case where the road branches once again after the passing of the branch point at which the road branches at a narrow angle.

Figure 6A:
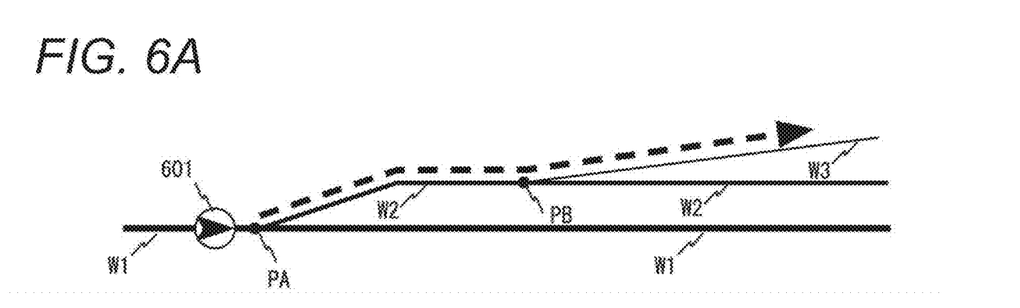
FIG. 6A and FIG. 6B are views illustrating a problem of a related art.

That is, as illustrated in FIG. 6A, a case is considered where a road W3 branches from a road W2 at a branch point PB after the road W2 branches from a road W1 at a branch point PA at a narrow angle and a distance between the branch point PA and the branch point PB is short, when seen in a traveling direction.

In such a case, as illustrated by an arrow, where a current position 601 moves from the road W1 to the road W2 at the branch point PA and moves from the road W2 to the road W3 at the branch point PB, when the current position 601 passes the branch point PA, the road W1 and the road W2 which branch from each other at the branch point PA are set as candidate roads and the map-matching in an altitude direction is started with the candidate roads as objects.

Since a distance between the branch point PA and the branch point PB is short, there is a case where a position on the road W2 may not be calculated correctly as the current position 601 by the map-matching in an altitude direction before the current position 601 reaches the branch point PB.

Figure 6B:
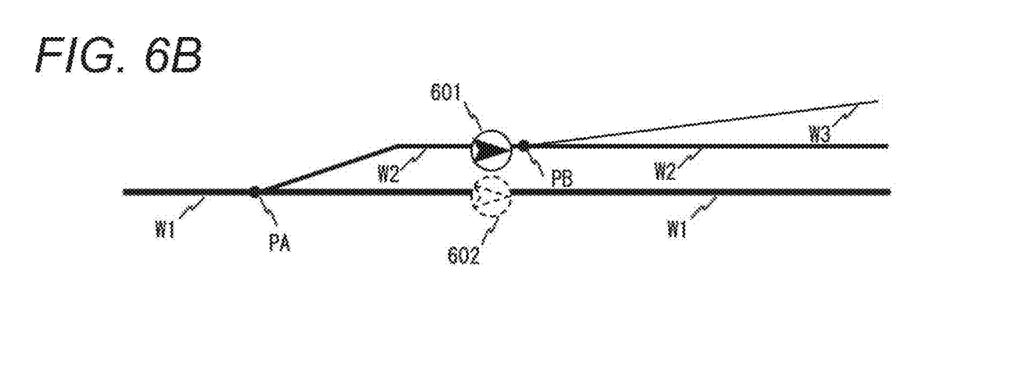

When a position on the road W2 cannot be calculated correctly as the current position 601 before the current position 601 reaches the branch point PB, the road W3 not branching at the branch point PA is not included in the candidate roads of the map-matching in an altitude direction started at the passing of the branch point PA, and thus, even when the current position 601 moves on the road W3, it may not be possible to calculate the current position on the road W3 correctly thereafter. For example, as illustrated in FIG. 6B, when the current position is miscalculated at a position 602 on the road W1 although an actual current position 601 is on the road W2, a position on the road W3 is not calculated as the current position since the road W3 is not connected to the road W1 directly.

The present disclosure teaches navigation systems that may calculate a current position correctly even when a first branch point at which a road branches at a narrow angle and a different branch point reachable by traveling a road branching at the first branch point are close to each other.

To realize what has been described above, in an embodiment of the present invention, a navigation system configured to calculate a current position of an automobile, a storage unit configured to store map data indicating a two-dimensional map in longitude and latitude and a gradient of a road, an inclination angle calculation unit configured to detect an inclination angle of the automobile, a measurement unit configured to measure a position in longitude and latitude directions of the automobile, and a current position calculation unit configured to perform first current position calculation processing to calculate a position on the road as a current position by map-matching between a position measured by the measurement unit and the two-dimensional map in longitude and latitude indicated by the map data are provided. When the current position passes a narrow-angle branch point which is a branch point at which the road branches at a narrow angle, the current position calculation unit is configured to calculate all routes which can be traveled after the passing of the narrow-angle branch point in a current traveling direction, and is configured to stop the first current position calculation processing and to start second current position calculation processing after the passing of the narrow-angle branch point.

The second current position calculation processing is processing to calculate a degree of certainty of each route as a route currently traveled according to a matching degree between a gradient of each route indicated by the map data and the inclination angle detected by the inclination angle calculation unit until a degree of certainty equal to or higher than a predetermined level is calculated in respect to any of the routes, and to calculate a position on a route, in which the degree of certainty equal to or higher than the predetermined level is calculated, as the current position when the degree of certainty equal to or higher than the predetermined level is calculated in respect to any of the routes. Then, when there is a different branch point in a position, within a predetermined distance from the narrow-angle branch point, on a road branching at the narrow-angle branch point, the all routes include a plurality of routes which goes to the different branch point from the narrow-angle branch point and respectively goes to a plurality of roads branching at the different branch point.

Here, in such a navigation system, each of the routes may be a route from the narrow-angle branch point to a point reachable by traveling for a predetermined distance after the passing of the narrow-angle branch point in the current traveling direction.

Also, in the above navigation system, the current position calculation unit may calculate, as the current position, a position moved, for a distance traveled after the passing of the narrow-angle branch point, on the route in which the degree of certainty equal to or higher than the predetermined level is calculated in the second current position calculation processing.

Also, in the above navigation system, the first current position calculation processing may be to calculate, as the current position, a position on a road which position is reachable by traveling the road from a position previously calculated as the current position, and when calculating, as the current position, a position on the route in which the degree of certainty equal to or higher than the predetermined level is calculated in the second current position calculation processing, the current position calculation unit may stop the second current position calculation processing and may resume the first current position calculation processing.

Also, in the above navigation system, when a predetermined distance is traveled after the passing of the narrow-angle branch point and before the degree of certainty equal to or greater than the predetermined level is calculated in respect to any of the routes in the second current position calculation processing, the current position calculation unit may stop the second current position calculation processing and may resume the first current position calculation processing.

In implementations of the above-described navigation system, a guidance route guiding unit configured to set a guidance route to a destination and to guide the set guidance route may be further provided. Until the degree of certainty equal to or greater than the predetermined level is calculated in respect to any of the routes after the passing of the narrow-angle branch point in the second current position calculation processing, the current position calculation unit may calculate a position on the guidance route as the current position when the guidance route is set, and may calculate a position on a route, in which the highest degree of certainty is calculated, as the current position when no guidance route is set.

In implementations of the described navigation systems, after passing of a narrow-angle branch point which is a branch point at which a road branches at a narrow angle, a degree of certainty of each route as a route currently traveled is calculated, with all routes which can be traveled after the passing of the narrow-angle branch point as objects, according to a matching degree between a gradient of each route calculated by map data and an inclination angle detected by the inclination angle calculation unit, and a position on a route, in which the degree of certainty equal to or higher than the predetermined level is calculated, is calculated as a current position. Here, when there is a different branch point in a position, within a predetermined distance from the narrow-angle branch point, on a road branching at the narrow-angle branch point, the all routes include a plurality of routes which goes to the different branch point from the narrow-angle branch point and respectively goes to a plurality of roads branching at the different branch point.

Thus, in implementations of the navigation system, where a narrow-angle branch point and a different branch point reachable by traveling a road branching at the narrow-angle branch point are close to each other and where traveling is performed through the different branch point, even when a current position is not calculated correctly before reaching the different branch point, it becomes possible to calculate the current position correctly after the passing of the different branch point.

As described, in implementations of a navigation system, it is possible to calculate a current position correctly even when a first branch point at which a road branches at a narrow angle and a different branch point reachable by traveling a road branching at the first branch point are close to each other.

DESCRIPTION OF THE PREFERRED EMBODIMENTS

Figure 1:
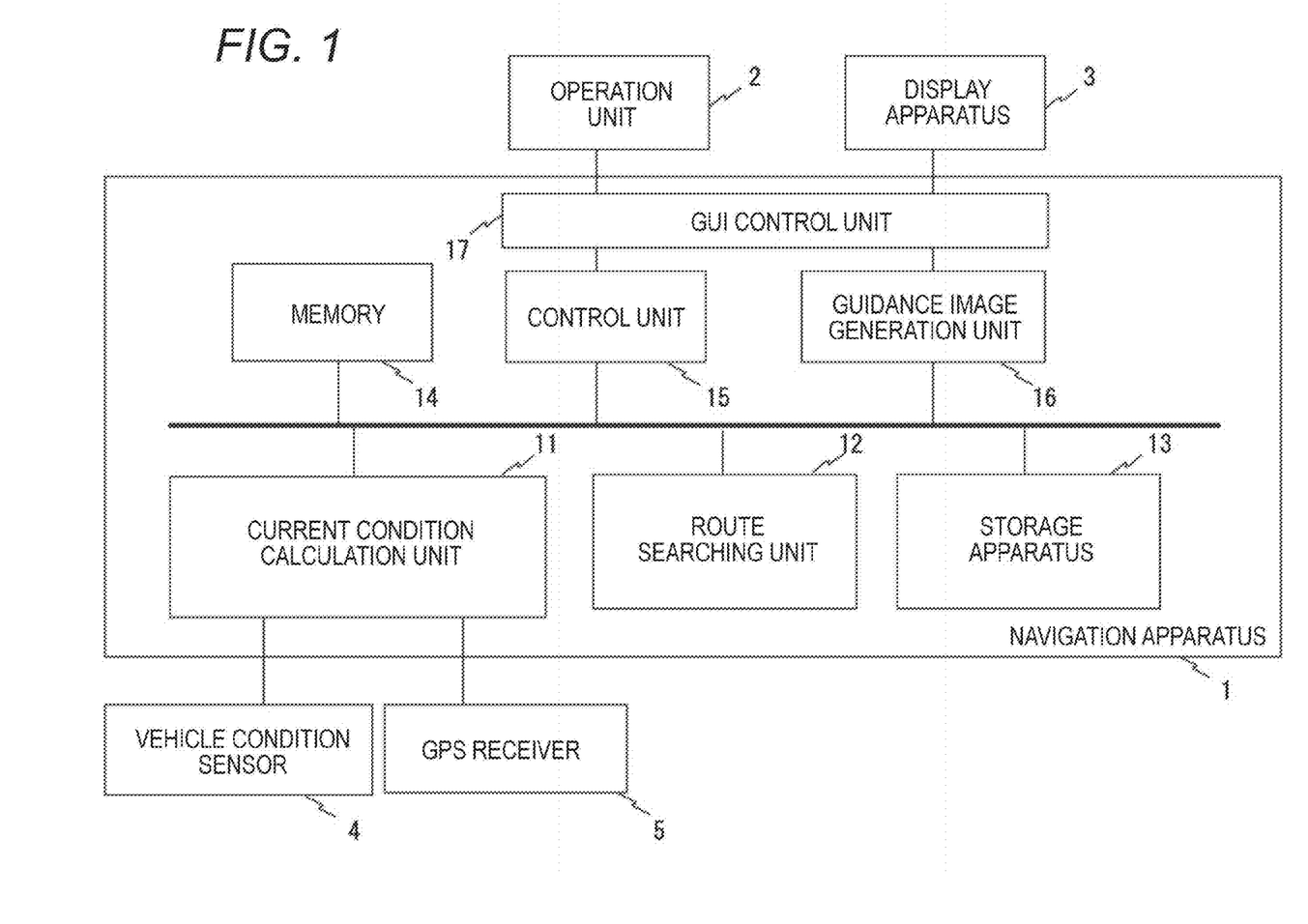
FIG. 1 is a block diagram illustrating a configuration of a navigation system.

FIG. 1 is a block diagram illustrating a configuration of a navigation system. As illustrated, the navigation system includes a navigation apparatus 1, an operation unit 2, a display apparatus 3, a vehicle condition sensor 4, and a GPS receiver 5. Here, the vehicle condition sensor 4 may include various sensors to detect a vehicle condition, such as a direction sensor such as an angular acceleration sensor or a geomagnetic sensor, a vehicle-speed sensor such as a vehicle-speed pulse sensor, and an inclination sensor such as an acceleration sensor.

The navigation apparatus 1 includes a current condition calculation unit 11, a route searching unit 12, a storage apparatus 13 which stores map data or the like to indicate a map, a memory 14, a control unit 15, a guidance image generation unit 16, and a GUI control unit 17 to provide a user a GUI using the operation unit 2 or the display apparatus 3.

However, in terms of hardware, the above navigation apparatus 1 may be a CPU circuit which includes a general configuration including a microprocessor, a memory, and different peripheral devices such as a graphic processor or a geometric processor. In such a case, each part of the above described navigation apparatus 1 may be realized as a process realized by the microprocessor executing a previously-prepared program. In addition, in such a case, such a program may be provided to the navigation apparatus 1 through a recording medium or an appropriate communication channel.

Here, in such a configuration, map data stored in the storage apparatus 13 includes, in addition to data indicating a two-dimensional map in longitude and latitude, data indicating an altitude or a gradient of a road at least in respect to a section equal to or longer than a predetermined distance L to be traveled after passing of a branch point branching at a narrow angle.

Here, in such a configuration, the current condition calculation unit 11 of the navigation apparatus 1 performs current position calculation processing by two dimensional map-matching.

In current position calculation processing by this two dimensional map-matching, the current condition calculation unit 11 performs map-matching processing between a measured position in longitude and latitude directions or a track of the measured position, the position being measured as a current position by autonomous navigation using the vehicle condition sensor 4 or by satellite positioning using the GPS receiver 5, and a two-dimensional map in longitude and latitude indicated by the map data read from the storage apparatus 13.

Then, the current condition calculation unit 11 calculates, as a current position, a position with a highest degree of certainty as the current position from positions on a road reachable by traveling the road from a position previously calculated as the current position and calculates a traveling direction with the highest degree of certainty as a current traveling direction, and then, sets the current position and the current moving direction into the memory 14.

However, in the current position calculation processing by the two dimensional map-matching, in a case where, from the perspective of a measured position in longitude and latitude directions or a track of the measured position, there is not a position with the degree of certainty, as the current position, equal to or higher than the predetermined degree on a road reachable by traveling a road from the position previously calculated as the current position, a position likely to be the current position on an arbitrary road is calculated as the current position.

In addition, according to a destination setting request from a user, the control unit 15 receives setting of a destination from the user through the operation unit 2 and the GUI control unit 17 and sets the setting into the memory 14. Then, the control unit 15 makes the route searching unit 12 search a route to the destination set into the memory 14.

The route searching unit 12 reads map data in a necessary geographical range from the storage apparatus 13 and searches a route from the current position to the destination, which are set in the memory 14, by predetermined searching algorithm. Then, the route searching unit 12 sets the searched route as a guidance route and sets route data of the guidance route into the memory 14.

In addition, when the current position set in the memory 14 gets close to the destination, the control unit 15 determines an arrival at the destination and performs processing to clear the destination and the guidance route set in the memory 14.

In addition, the control unit 15 repeats the following guidance image generation processing.

That is, the control unit 15 determines a display direction in such a manner that the current traveling direction set into the memory 14 or the north direction becomes upward, determines a map scale according to a user setting or an initial setting set previously, and determines, as a map display range, a geographical range of a predetermined size which range is around a current position with the current position as a reference and is determined according to the determined display direction and the determined map scale.

Then, the guidance image generation unit 16 is made to generate, on a map based on map data in the determined map display range, a guidance image illustrating a current position mark indicating the current position set into the memory 14 on the map. In addition, when the route data of the guidance route is set into the memory 14, the control unit 15 makes the guidance image generation unit 16 illustrate, in the guidance image, a guidance route figure indicating the guidance route on a map in the determined map display range. Also, when the destination set into the memory 14 is included in the map display range, the control unit 15 also makes the guidance image generation unit 16 illustrate, in the guidance image, a destination mark indicating a position of the destination on the map.

On the other hand, according to the control by the control unit 15, the guidance image generation unit 16 generates a guidance image by illustrating what has been described above and displays the generated guidance image on the display apparatus 3 through the GUI control unit 17.

Figure 2:
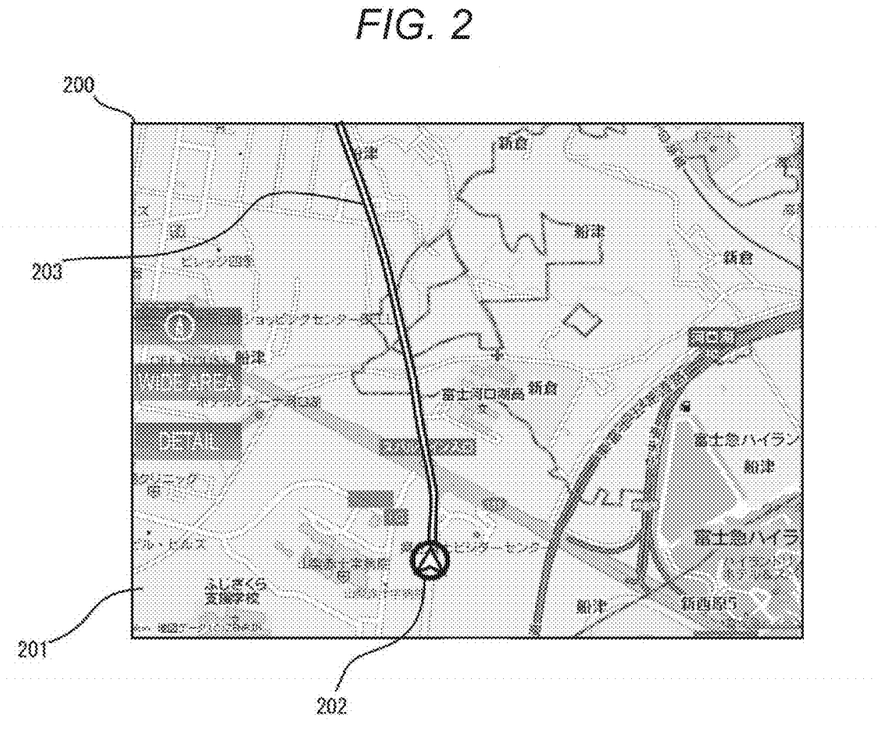
FIG. 2 is a view illustrating an example display of a navigation system.

In FIG. 2, a guidance image displayed on the display apparatus 3 in such a manner is illustrated. As illustrated, a guidance image 200 is an image in which a current position mark 202 indicating a current position or a guidance route FIG. 203 indicating a guidance route is displayed on a map image 201 indicating a map within a map display range around the current position.

Referring back to FIG. 1, a current position calculation unit performs map-matching processing after narrow-angle branching along with the current position calculation processing by the two-dimensional map-matching.

In the following, the map-matching processing after narrow-angle branching performed by the current condition calculation unit 11 will be described.

Figure 3:
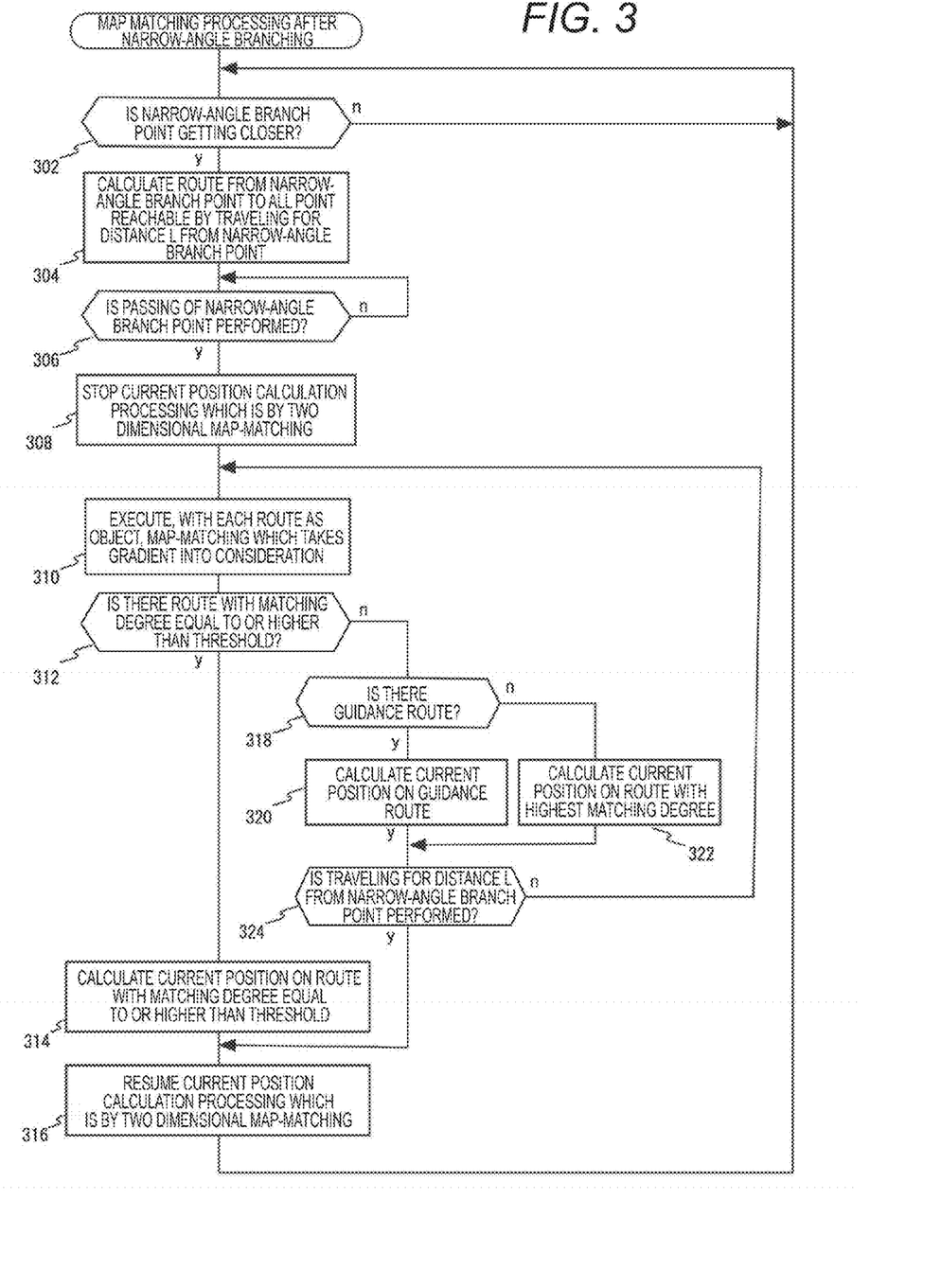
FIG. 3 is a flowchart illustrating one implementation of map-matching processing after narrow-angle branching.

In FIG. 3, a process of the map-matching processing after narrow-angle branching is illustrated. As illustrated, in this processing, approach of a current position to a narrow-angle branch point is monitored (step 302). Here, the narrow-angle branch point is a branch point at which a road branches to a plurality of roads, an angle between the plurality of roads which branches at the branch point being equal to or smaller than an angle θ (such as 45°).

When the narrow-angle branch point gets closer (step 302), routes are calculated (step 304) from the narrow-angle branch point to all points reachable by traveling for a distance L (such as 500 m) after passing of the narrow-angle branch point in a current traveling direction.

Figure 4A:
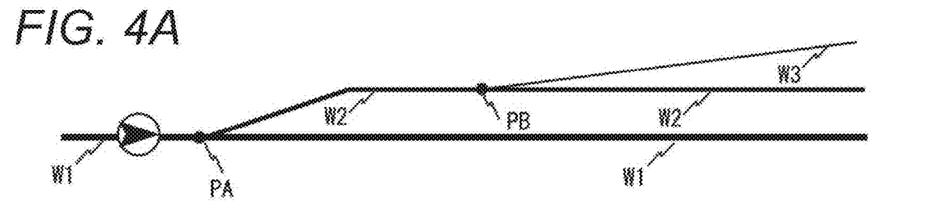
FIG. 4A to FIG. 4D are views illustrating example map-matching processing after narrow-angle branching.

That is, as illustrated in FIG. 4A, for example, in a case where a narrow-angle branch point PA at which a road W2 branches from a road W1 at a narrow angle gets closer while driving on the road W1, and where there is a branch point PB, at which a road W3 branches from the road W2, within the distance L from the narrow-angle branch point PA, the following three routes are calculated.

Figure 4B:
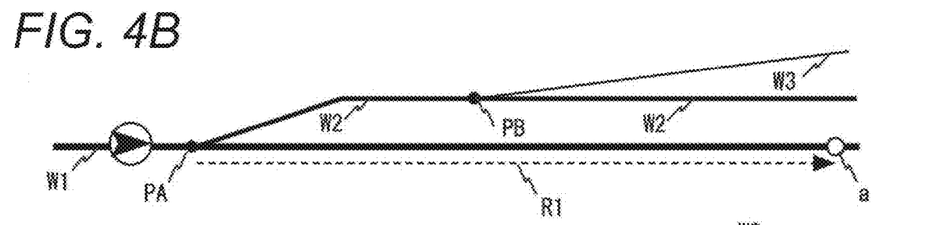
Figure 4C:
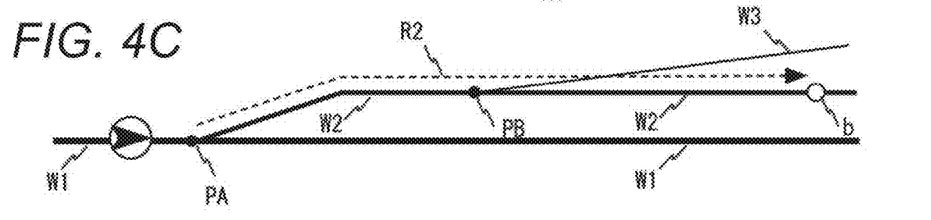
Figure 4D:
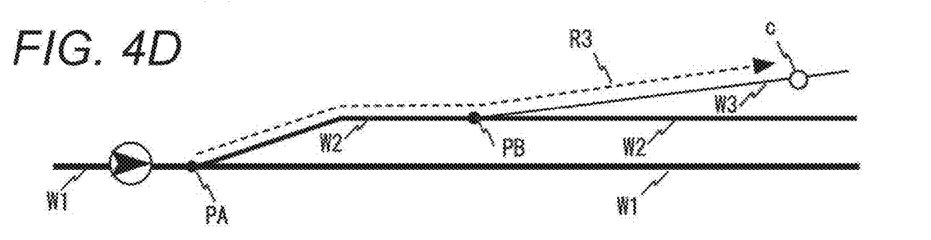

These routes are a route R1 which is a route to travel the road W1 from the narrow-angle branch point PA for the distance L and which reaches a point a at which a travel distance from the narrow-angle branch point PA becomes L as illustrated in FIG. 4B, a route R2 which is a route to travel the road W2 from the narrow-angle branch point PA for the distance L through the branch point PB and which reaches a point b at which a travel distance from the narrow-angle branch point PA becomes L as illustrated in FIG. 4C, and a route R3 which is a route to travel the road W3 after traveling the road W2 from the narrow-angle branch point PA to the branch point PB and which reaches a point c at which a travel distance from the narrow-angle branch point PA becomes L as illustrated in FIG. 4D.

Referring back to FIG. 3, when the routes are calculated in such a manner (step 304), a wait for the current position passing the narrow-angle branch point approach of which is detected in step 302 is performed (step 306), and the calculation processing of the current position by the two dimensional map-matching is stopped (step 308).

Then, map-matching which takes a gradient into consideration is performed with each route calculated in step 304 as an object (step 310).

Here, as the map-matching which takes a gradient into consideration, processing to calculate a matching degree between a gradient of each route indicated by map data and history of an inclination angle of a vehicle as a matching degree indicating a degree of certainty of each route as a route currently traveled.

Figure 5:
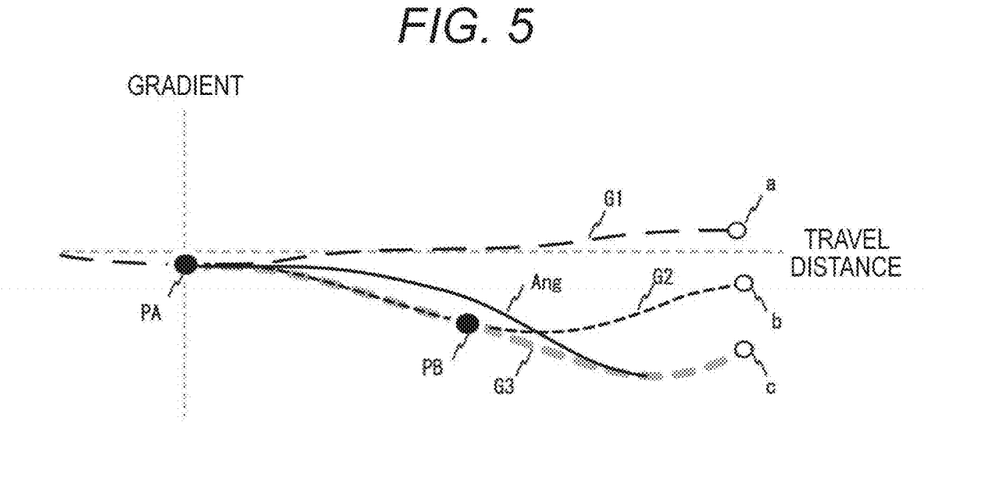
FIG. 5 is a view illustrating example map-matching processing after narrow-angle branching.

That is, for example, when three routes which are the route R1, the route R2, and the route R3 respectively illustrated in FIG. 4B, FIG. 4C, and FIG. 4D are calculated, and when as illustrated in FIG. 5, a gradient of the route R1 plotted for a distance from the narrow-angle branch point PA to the point a traveled for the distance L from the narrow-angle branch point PA is calculated as G1 from the map data, a gradient of the route R2 plotted for a distance from the narrow-angle branch point PA to the point b traveled for the distance L from the narrow-angle branch point PA is calculated as G2 from the map data, and a gradient of the route R3 plotted for a distance from the narrow-angle branch point PA to the point c traveled for the distance L from the narrow-angle branch point PA is calculated as G3 from the map data, a matching degree between Ang, which can be acquired by plotting an inclination angle of a vehicle detected by the inclination angle sensor of the vehicle condition sensor 4 after the passing of the narrow-angle branch point PA up to this moment for a travel distance from the narrow-angle branch point PA at a time point of the detection of the inclination angle, and G1 is calculated as a matching degree of the route R1, a matching degree between Ang and G2 is calculated as a matching degree of the route R2, and a matching degree between Ang and G3 is calculated as a matching degree of the route R3.

Here, the matching degree between Ang and G1 is calculated according to a predetermined calculation formula in such a manner that the matching degree becomes higher as an error (such as mean square error) of G1 to Ang becomes smaller. The matching degree between Ang and G2 and the matching degree between Ang and G3 are calculated in the similar manner.

Referring back to FIG. 3, when a matching degree of each route calculated by the map-matching which takes a gradient into consideration is calculated in such a manner (step 310), it is determined whether a route with the calculated matching degree equal to or higher than a predetermined threshold is generated (step 312). Here, as the threshold, a value which makes the following possible is set in advance. That is, with the value, when a matching degree is equal to or higher than the threshold, it can be assumed that a degree of certainty that a current position is on a route in which the matching degree equal to or higher than the threshold is calculated is adequately high.

Then, when it can be determined that a route with a matching degree equal to or higher than the threshold is generated (step 312), a current position is calculated on the route with the matching degree equal to or higher than the threshold (step 314). Accordingly, for example, in the case illustrated in FIG. 5, since the matching degree between Ang and G3 is adequately high, a current position is calculated on the route R3.

In the calculation of a current position on a route, the calculation is performed, for example, by setting, as a current position, a position moved on the route with the matching degree equal to or higher than the threshold, from the narrow-angle branch point, for a travel distance from the time point of passing the narrow-angle branch point approach of which is detected in step 302 up to this moment.

Then, the calculation processing of the current position by the two dimensional map-matching is resumed (step 316). Processing goes back to the processing in step 302 and approach to a next narrow-angle branch point is monitored.

On the other hand, when it is determined by the map-matching which takes a gradient into consideration in step 312 that a route with the matching degree equal to or higher than the threshold is not generated, it is determined whether a guidance route is set at this moment (step 318). When a guidance route is set, a current position is calculated on the guidance route (step 320). When no guidance route is set, a current position is calculated on a route with the highest matching degree calculated by the map-matching which takes a gradient into consideration (step 322).

Here, in the calculation of a current position in step 320, the calculation is performed, for example, by setting, as a current position, a position moved on the guidance route from the narrow-angle branch point for a travel distance from the time point of passing the narrow-angle branch point approach of which is detected in step 302 up to this moment. In the calculation of a current position in step 322, the calculation is performed, for example, by setting, as a current position, a position moved on the route with the highest matching degree from the narrow-angle branch point for a travel distance from the time point of passing the narrow-angle branch point approach of which is detected in step 302 up to this moment.

Then, it is determined whether traveling for the distance L is performed after the passing of the narrow-angle branch point approach of which is detected in step 302 (step 324). When the traveling for the distance L is not performed after the passing of the narrow-angle branch point, processing goes back to the processing in and after step 310. When the traveling for the distance L is performed after the passing of the narrow-angle branch point, the calculation processing of the current position by the two dimensional map-matching is resumed (step 316). Then, processing goes back to the processing in step 302 and approach to a next narrow-angle branch point is monitored.

In the above, the map-matching processing after narrow-angle branching performed by the current condition calculation unit 11 has been described.

In the above map-matching processing after narrow-angle branching, as the map-matching which takes a gradient into consideration, a matching degree between a gradient of each route indicated by map data and history of an inclination angle of a vehicle is calculated as a matching degree of each route. However, as the map-matching which takes a gradient into consideration, three dimensional map-matching may be performed. In the three dimensional map-matching, a comprehensive matching degree with a matching degree between a gradient of each route and history of an inclination angle of a vehicle and a matching degree between a measured position in longitude and latitude directions or a track of the measured position and a position or a shape of each route indicated by map data is calculated as a matching degree.

As described, in implementations of a navigation system, after passing of a narrow-angle branch point which is a branch point at which a road branches at a narrow angle, a matching degree indicating a degree of certainty of each route as a route currently traveled is calculated, according to a matching degree between a gradient of each route calculated by map data and an inclination angle of an automobile, with all routes as objects which routes can be traveled after the passing of the narrow-angle branch point and are routes to points away from the narrow-angle branch point for a distance L. Then, a position on a route, in which a matching degree equal to or higher than a threshold is calculated, is calculated as a current position. Here, when there is a different branch point in a position, within the predetermined distance L from the narrow-angle branch point, on a road branching at the narrow-angle branch point, the all routes include a plurality of routes which goes to the different branch point from the narrow-angle branch point and respectively goes to a plurality of roads branching at the different branch point.

Thus, in some implementations, where a narrow-angle branch point and a different branch point reachable by traveling a road branching at the narrow-angle branch point are close to each other and are within a distance L and where traveling is performed through the different branch point, even when a current position is not calculated correctly before reaching the different branch point, it becomes possible to calculate the current position correctly after the passing of the different branch point.

It is therefore intended that the foregoing detailed description be regarded as illustrative rather than limiting, and that it be understood that it is the following claims, including all equivalents, that are intended to define the spirit and scope of this invention.

What is claimed is:

1. A navigation system mounted in an automobile to calculate a current position of the automobile, comprising:
   a storage unit configured to store map data indicating a two-dimensional map in longitude and latitude and a gradient of a road;
   an inclination angle calculation unit configured to detect an inclination angle of the automobile;
   a measurement unit configured to measure a position in longitude and latitude directions of the automobile; and
   a current position calculation unit configured to perform first current position calculation processing to calculate a position on the road as a current position by map-matching between a position measured by the measurement unit and the two-dimensional map in longitude and latitude indicated by the map data,
   wherein when the current position passes a narrow-angle branch point which is a branch point at which the road branches at a narrow angle, the current position calculation unit is configured to calculate all routes which can be traveled after the passing of the narrow-angle branch point in a current traveling direction, and after the passing of the narrow-angle branch point, the current position calculation unit is configured to stop the first current position calculation processing and to start second current position calculation processing,
   wherein the second current position calculation processing is processing to calculate a degree of certainty of each route as a route currently traveled according to a matching degree between a gradient of each route indicated by the map data and the inclination angle detected by the inclination angle calculation unit until a degree of certainty equal to or higher than a predetermined level is calculated in respect to any of the routes, and to calculate a position on a route, in which the degree of certainty equal to or higher than the predetermined level is calculated, as the current position when the degree of certainty equal to or higher than the predetermined level is calculated in respect to any of the routes, and
   when there is a different branch point in a position, within a predetermined distance from the narrow-angle branch point, on a road branching at the narrow-angle branch point, all routes include a plurality of routes which goes to the different branch point from the narrow-angle branch point and respectively goes to a plurality of roads branching at the different branch point.

2. The navigation system according to claim 1, wherein each of the routes is a route from the narrow-angle branch point to a point reachable by traveling for a predetermined distance after the passing of the narrow-angle branch point in the current traveling direction.

3. The navigation system according to claim 1, wherein the current position calculation unit is configured to calculate, as the current position, a position moved, for a distance traveled after the passing of the narrow-angle branch point, on the route in which the degree of certainty equal to or higher than the predetermined level is calculated in the second current position calculation processing.

4. The navigation system according to claim 1, wherein the first current position calculation processing is configured to calculate, as the current position, a position on a road which position is reachable by traveling the road from a position previously calculated as the current position, and
   when calculating, as the current position, a position on the route in which the degree of certainty equal to or higher than the predetermined level is calculated in the second current position calculation processing, the current position calculation unit is configured to stop the second current position calculation processing and to resume the first current position calculation processing.

5. The navigation system according to claim 1, wherein when a predetermined distance is traveled after the passing of the narrow-angle branch point and before the degree of certainty equal to or higher than the predetermined level is calculated in respect to any of the routes in the second current position calculation processing, the current position calculation unit is configured to stop the second current position calculation processing and to resume the first current position calculation processing.

6. The navigation system according to claim 1, further comprising a guidance route guiding unit configured to set a guidance route to a destination and to guide the set guidance route,
   wherein until the degree of certainty equal to or higher than the predetermined level is calculated in respect to any of the routes after the passing of the narrow-angle branch point in the second current position calculation processing, the current position calculation unit is configured to calculate a position on the guidance route as the current position when the guidance route is set, and to calculate a position on a route, in which the highest degree of certainty is calculated, as the current position when no guidance route is set.

7. A non-transitory computer-readable storage medium storing a computer program read and executed by a computer mounted in an automobile,
   wherein the computer program causes the computer to function as:
   a storage unit which stores map data indicating a two-dimensional map in longitude and latitude and a gradient of a road;
   an inclination angle calculation unit configured to detect an inclination angle of the automobile;
   a measurement unit configured to measure a position in longitude and latitude directions of the automobile; and
   a current position calculation unit configured to perform first current position calculation processing to calculate a position on the road as a current position by map-matching between a position measured by the measurement unit and the two-dimensional map in longitude and latitude indicated by the map data, and
   wherein when the current position passes a narrow-angle branch point which is a branch point at which the road branches at a narrow angle, the current position calculation unit calculates all routes which can be traveled after the passing of the narrow-angle branch point in a current traveling direction, and after the passing of the narrow-angle branch point, the current position calculation unit stops the first current position calculation processing and starts a second current position calculation processing, wherein the second current position calculation processing is processing to calculate a degree of certainty of each route as a route currently traveled according to a matching degree between a gradient of each route indicated by the map data and the inclination angle detected by the inclination angle calculation unit until a degree of certainty equal to or higher than a predetermined level is calculated in respect to any of the routes, and to calculate a position on a route, in which the degree of certainty equal to or higher than the predetermined level is calculated, as the current position when the degree of certainty equal to or higher than the predetermined level is calculated in respect to any of the routes, and wherein when there is a different branch point in a position, within a predetermined distance from the narrow-angle branch point, on a road branching at the narrow-angle branch point, the all routes include a plurality of routes which goes to the different branch point from the narrow-angle branch point and respectively goes to a plurality of roads branching at the different branch point.

8. The computer-readable storage medium of claim 7, wherein each of the routes is a route from the narrow-angle branch point to a point reachable by traveling for a predetermined distance after the passing of the narrow-angle branch point in the current traveling direction.

9. The computer-readable storage medium of claim 7, wherein the current position calculation unit calculates, as the current position, a position moved, for a distance traveled after the passing of the narrow-angle branch point, on the route in which the degree of certainty equal to or higher than the predetermined level is calculated in the second current position calculation processing.

10. The computer-readable storage medium of claim 7, wherein the first current position calculation processing is to calculate, as the current position, a position on a road which position is reachable by traveling the road from a position previously calculated as the current position, and when calculating, as the current position, a position on the route in which the degree of certainty equal to or higher than the predetermined level is calculated in the second current position calculation processing, the current position calculation unit stops the second current position calculation processing and resumes the first current position calculation processing.

11. The computer-readable storage medium of claim 7, wherein when a predetermined distance is traveled after the passing of the narrow-angle branch point and before the degree of certainty equal to or higher than the predetermined level is calculated in respect to any of the routes in the second current position calculation processing, the current position calculation unit stops the second current position calculation processing and resumes the first current position calculation processing.

12. The computer-readable storage medium of claim 7, wherein the computer program causes the computer to function further as a guidance route guiding unit configured to set a guidance route to a destination and to guide the set guidance route, wherein until the degree of certainty equal to or higher than the predetermined level is calculated in respect to any of the routes after the passing of the narrow-angle branch point in the second current position calculation processing, the current position calculation unit calculates a position on the guidance route as the current position when the guidance route is set, and calculates a position on a route, in which the highest degree of certainty is calculated, as the current position when no guidance route is set.

13. A current position calculation method to calculate, in a navigation system mounted in an automobile, a current position after the automobile passes a narrow-angle branch point which is a branch point at which a road branches at a narrow angle, the method comprising:

a first step in which the navigation system calculates all routes which can be traveled after the passing of the narrow-angle branch point in a current traveling direction when the current position passes the narrow-angle branch point which is the branch point at which the road branches at a narrow angle; and a second step in which while detecting an inclination angle of the automobile, the navigation system calculates, after the passing of the narrow-angle branch point, a degree of certainty of each route as a route currently traveled according to a matching degree between a gradient of each route, which is indicated by map data indicating a two-dimensional map in longitude and latitude and a gradient of the road, and the inclination angle, which is detected by the navigation system, until a degree of certainty equal to or higher than a predetermined level is calculated in respect to any of the routes, and calculates, as a current position, a position on a route in which the degree of certainty equal to or higher than the predetermined level is calculated when the degree of certainty equal to or higher than the predetermined level is calculated in respect to any of the routes, wherein when there is a different branch point in a position, within a predetermined distance from the narrow-angle branch point, on a road branching at the narrow-angle branch point, the all routes include a plurality of routes which goes to the different branch point from the narrow-angle branch point and respectively goes to a plurality of roads branching at the different branch point.

14. The current position calculation method according to claim 13, wherein each of the routes is a route from the narrow-angle branch point to a point reachable by traveling for a predetermined distance after the passing of the narrow-angle branch point in the current traveling direction.

15. The current position calculation method according to claim 13, wherein the navigation system calculates, as the current position, a position moved, for a distance traveled after the passing of the narrow-angle branch point, on the route in which the degree of certainty equal to or higher than the predetermined level is calculated in the second step.

16. The current position calculation method according to claim 13, further comprising a third step in which the navigation system sets a guidance route to a destination and guides the guidance route, wherein in the second step, until the degree of certainty equal to or higher than the predetermined level is calculated in respect to any of the routes after the passing of the narrow-angle branch point, the navigation system calculates a position on the guidance route as the current position when the guidance route is set and calculates a position on a route, in which the highest degree of certainty is calculated, as the current position when the guidance route is not set.

* * * * *